RADIO CHASSIS MOUNTING CONSTRUCTION

Filed April 24, 1946 3 Sheets-Sheet 1

Inventor
Barton T. Setchell
By Robert M. Dunning
Attorney

RADIO CHASSIS MOUNTING CONSTRUCTION

Filed April 24, 1946 3 Sheets-Sheet 2

Inventor
Barton T. Setchell
By Robert M. Dunning
Attorney

April 17, 1951 B. T. SETCHELL 2,549,021

RADIO CHASSIS MOUNTING CONSTRUCTION

Filed April 24, 1946 3 Sheets-Sheet 3

Inventor
Barton T. Setchell

By Robert M. Dunning
Attorney

Patented Apr. 17, 1951

2,549,021

UNITED STATES PATENT OFFICE 2,549,021

RADIO CHASSIS MOUNTING CONSTRUCTION

Barton T. Setchell, St. Paul, Minn.

Application April 24, 1946, Serial No. 664,491

9 Claims. (Cl. 250—14)

My invention relates to an improvement in radio chassis mounting construction and deals more particularly in the manner of mounting the radio chassis within its cabinet.

During recent years it has become common practice to mold radio cabinets of plastic or similar material. Such cabinets may be made at relatively low cost, present an attractive appearance and are easy to keep clean. One of the difficulties in manufacturing such cabinets lies in the fact that it is usually necessary to employ metal inserts embedded in the plastic to permit the chassis to be connected thereto. Such inserts increase the molding time considerably. As a result the cost of production of the cabinets is considerably increased because of these inserts.

It is an object of the present invention to provide a cabinet which may be molded without the use of metal inserts and to which the radio chassis may be easily and quickly secured. In place of bolting the chassis to the cabinet, I slidably mount the chassis on a series of parallel posts and provide a simple means of holding the chassis so engaged. As a result the construction of the cabinets is considerably simplified and the assembly time is also greatly decreased.

A feature of the present invention resides in molding a cabinet body with a plurality of parallel posts and to equip the chassis with a similar number of apertures spaced and shaped to accommodate the posts. As a result the chassis may be slidably engaged upon the posts and supported thereby.

A further feature of the present invention resides in the provision of grooves in the posts or heads thereupon for engaging a spring member supported upon the chassis. The spring is engageable into the grooves or beneath the heads of the posts, thereby holding the chassis supported upon the posts.

A further feature of the present invention lies in the ease with which the chassis may be inserted into or removed from its cabinet. In inserting the chassis into the cabinet it is only necessary to slide the chassis onto the supporting posts until the spring fingers on the chassis engage in the grooves of the post. In removing the chassis it is only necessary to flex the spring fingers out of the locking grooves in the posts and to slide the chassis from the cabinet.

A further feature of the preent invention lies in the manner of supporting the operating knobs of the radio receiving unit. The knobs are mounted to project beyond the cabinet and the chassis is moved into the cabinet in a radial direction relative to the knobs. Slots are provided in the cabinet through which a portion of the periphery of each knob may extend. As a result a portion of each knob is accessible from the exterior of the cabinet. Thus in the assembly of the radio receiving unit, it is not necessary to attach the knobs after the chassis is inserted into its cabinet.

A feature of the present invention lies in the provision of a radio receiving unit chassis which is complete with speaker, antenna, and operating dials which may be readily tried out and tested either before it is inserted into the cabinet or afterwards. This completely assembled chassis is then merely inserted into the cabinet so that portions of the periphery of the operating knobs project through suitable slots in the cabinet. When thus inserted the radio receiving unit is in readiness for operation.

These and other objects and novel features of my invention will be more clearly and fully set forth in the following specification and claims.

In the drawings forming a part of my specification:

Figure 1:
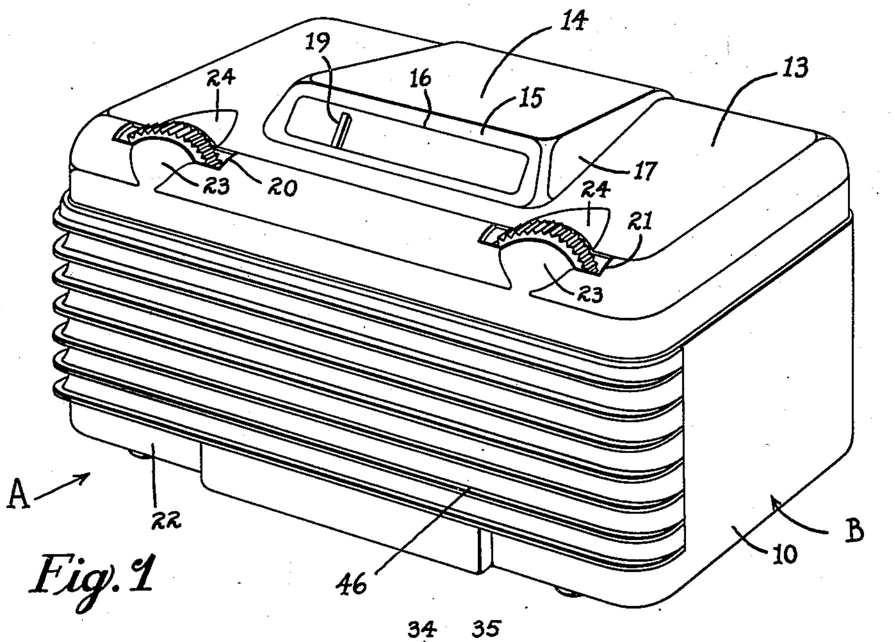
Figure 1 is a perspective view of my radio receiving unit in completed form.

The radio receiving unit A includes the outer cabinet B and the chassis C. The cabinet may be of any suitable shape or size, but in the form illustrated comprises a table model radio receiving unit of relatively small size. The cabinet B is cast of phenolic and urea plastics although obviously other materials could be used for this purpose. The cabinet B includes end walls 10 and 11, a rear wall 12 and a top wall 13. The top wall 13 is provided with an upwardly sloping central portion 14 projecting above the level of the remainder of the top 13. This upwardly sloping surface 14 merges into a downwardly inclined surface 15 having an aperture 16 therein. The sloping surfaces 14 and 15 are prvoided with substantially triangular side walls 17 connecting these sloping surfaces to the remainder of the top 13. The aperture 16 provides a window by means of which the indicator finger 19 may be seen. The pointer 19 is slidable longitudinally of a scale which may bear suitable indicia to facilitate the tuning of the radio receiving unit. The aperture 16 is usually closed by this transparent scale through which the pointer 19 may be seen.

A pair of spaced slots 20 and 21 are provided in the top 13 near the front wall 22 of the cabinet. The top 13 is bulged upwardly at 23 forwardly of the slots 20 and 21, and is also bulged upwardly at 24 rearwardly of the slots 20 and 21. These upward bulges adjacent the slots are provided to enclose portions of the radio receiving unit operating knobs which extend through the slots and also to improve the appearance of the cabinet. The bulges also permit the knob supporting means to' extend somewhat higher than would otherwise be possible.

Figure 4:
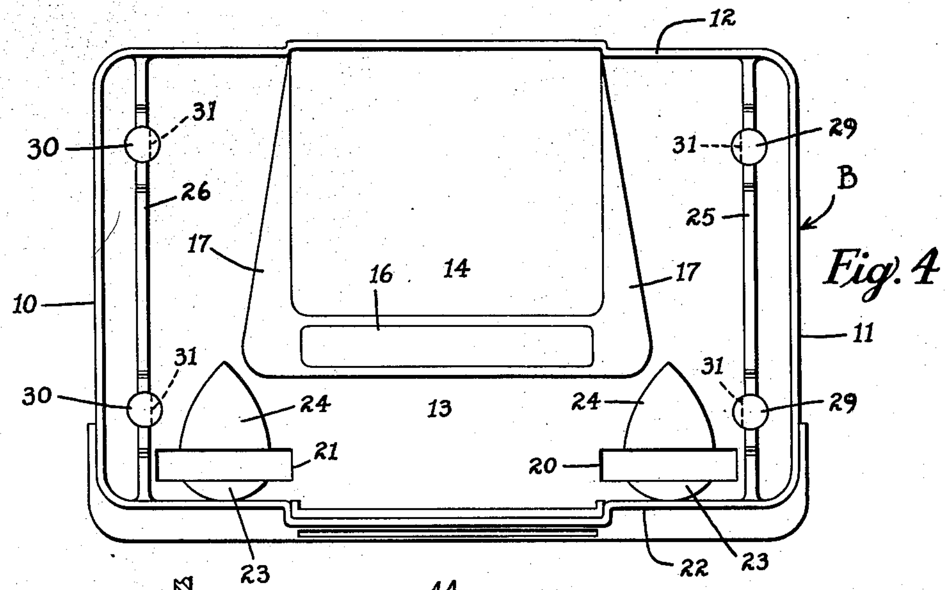
Figure 4 is a bottom plan view of the cabinet in readiness to receive the chassis.
Figures 5, 6, 7, 8:
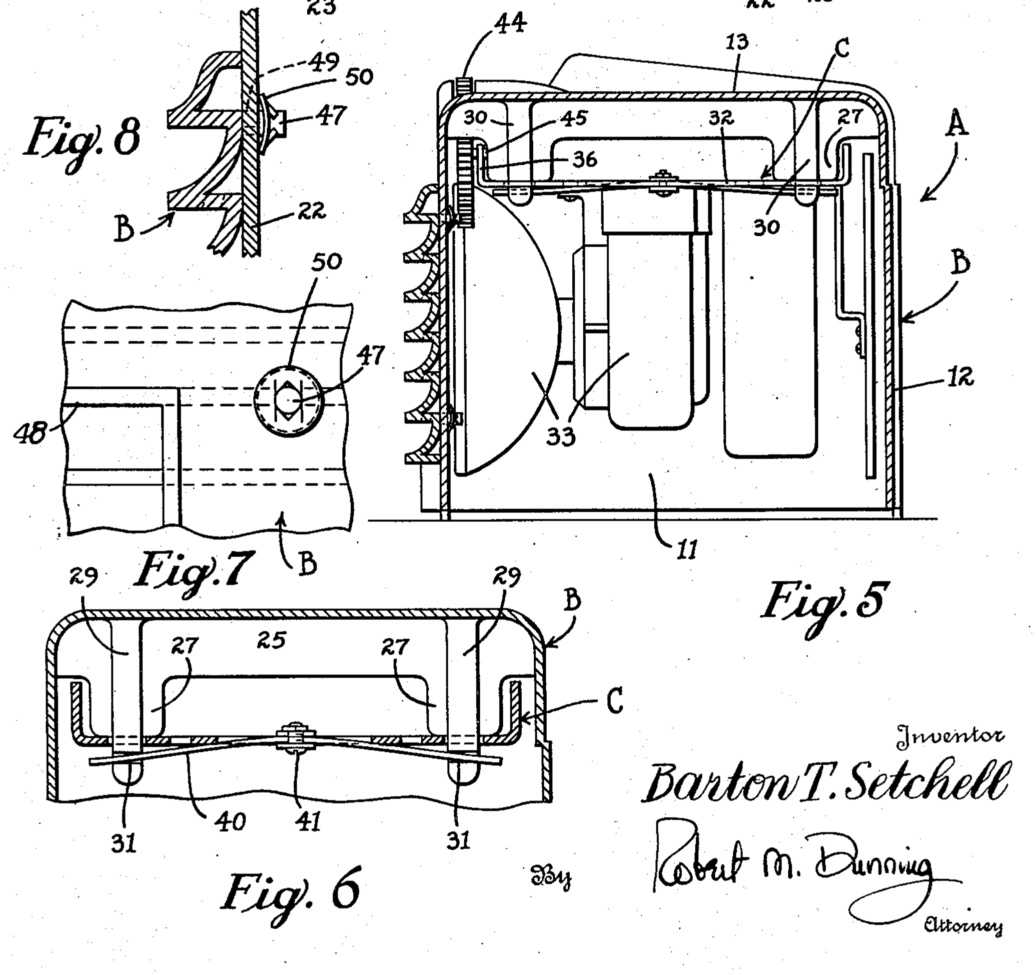
Figure 5 is a sectional view through one end of the cabinet showing the chassis in place therein.
Figure 6 is a sectional view through a portion of the chassis and cabinet showing the manner in which the chassis is supported.
Figure 7 is a view through a portion of the front wall of the cabinet showing the manner in which the speaker grill is attached to the cabinet.
Figure 8 is a sectional view through a portion of the speaker grill showing the manner in which it is attached to the cabinet.

The top 13 is provided with a pair of parallel reinforcing ribs 25 and 26 extending from the rear wall 12 to the front wall 22. These reinforcing ribs act to strengthen the top 13 and also to provide a support for the chassis C. As best illustrated in Figures 5 and 6 of the drawings, the ribs 25 and 26 are provided with integral projections 27 which serve to limit the extent to which the chassis may be inserted into the cabinet. Integral with the reinforcing ribs 25 and 26, I provide chassis supporting posts on which the chassis is supported. Posts 29 project from the reinforcing rib 25 while similar posts 30 project from the rib 26. These posts 29 and 30 are provided with a transverse slot or groove 31 therein at a point spaced from the end thereof. The slots or grooves are best illustrated in Figures 4 and 6 of the drawings.

The radio receiving unit chassis C includes a mounting panel 32 on which the various elements of the receiving set are mounted. The panel 32 includes tube sockets for supporting the various tubes. The speaker 33 is mounted upon the panel 32 as are the tuning condensers and the like. An antenna 34 is also shown attached to the panel 32 by a bracket 35.

The mounting panel 32 is, in the form illustrated, generally rectangular in shape, and is of channel formation, being provided with parallel side flanges 36. Near these side flanges 36 and near the opposite ends of the panel 32, I provide apertures 37 which are properly spaced and are of proper size to freely receive the posts 29 and 30. A transverse slot 39 is provided in the panel 32 between each adjacent pair of apertures 37 or near each end of the chassis mounting panel 32. A spring wire 40 is positioned in each slot 39 and is of proper length to extend slightly past the aperture 37. The wire 40 is held in place by a bolt 41 which extends through the panel 32 and the slot 39, and which is provided with washers 42 which extend on both sides of the wire 40 to hold the same engaged partially in the slot 39. Each wire 40 is slightly curved upwardly from the center connection and normally extends over the apertures 37 near the center thereof.

The posts 29 and 30 are rounded or pointed at their free ends as indicated in Figures 5 and 6 of the drawings. When the chassis C is inserted into the cabinet B, the posts 29 and 30 are extended through the apertures 37 in the panel 32. The rounded ends of these posts engage the spring wires 40, flexing the wire inwardly so as to slide along the cylindrical surfaces of the posts. When the panel 32 is completely inserted into place the undersurface of the chassis panel 32 engages against the projections 27 of the reinforcing ribs 25 and 26 in the manner illustrated in Figures 5 and 6. At this point in the movement the spring wires engage in the grooves 31 in the posts as best illustrated in Figure 6. When thus engaged the chassis is held supported upon the posts 29 and 30. Obviously the chassis can not slide off the posts as long as the spring wires 40 are engaged in the notches or slots 31 of the posts and as these spring wires are resiliently urged into the notches, there is no chance for the chassis to be accidentally dislodged. Furthermore the chassis is resiliently urged against the rib projections 27 and when the chassis is inverted, as in the radio receiving unit A illustrated, these springs form a resilient mounting for the chassis.

Figure 2:
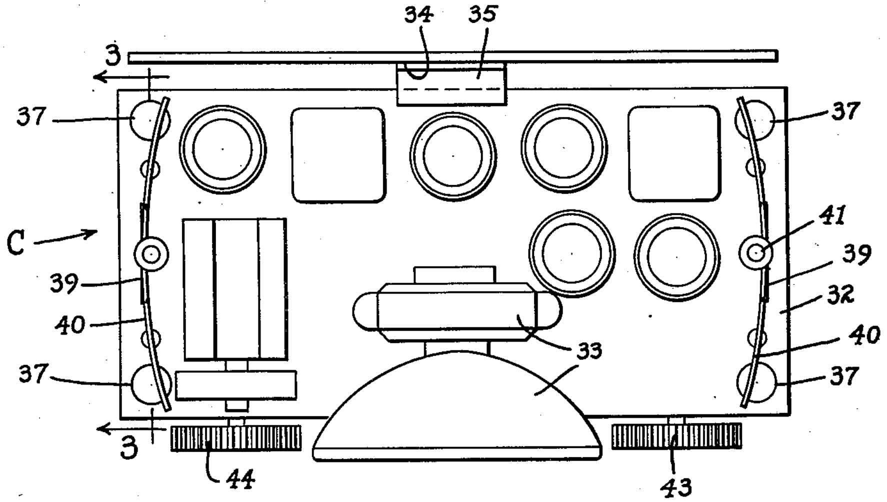
Figure 2 is a bottom plan view of the chassis in readiness for insertion into the cabinet.
Figure 3:
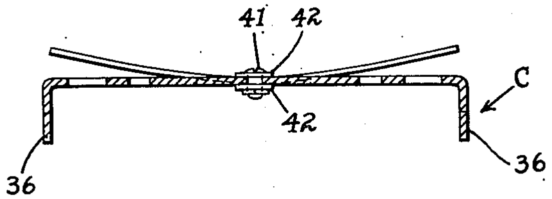
Figure 3 is a sectional view through a portion of the chassis, the position of the section being indicated by the line 3—3 of Figure 2.

As best illustrated in Figure 5 of the drawings the chassis is inverted when the radio receiving unit A is assembled, the tubes, speaker, and antenna depending from the mounting panel. Obviously the chassis could similarly be attached in upright position or supported with the panel 32 on a generally vertical plane as will be later described. As best illustrated in Figure 2 of the drawings a pair of relatively large diameter knobs 43 and 44 are pivotally supported to the chassis to extend somewhat below the flanges 36 of the panel 32. As indicated in Figure 5 of the drawings these knobs are supported with their axes 45 near the free edge of the flanges 36 so that the periphery of the knobs extends considerably beyond the edges of these flanges. Accordingly when the chassis C is inserted into the cabinet B, as illustrated in Figure 2, these knobs 43 and 44 extend through the slots 20 and 21 to project above the top 13 and slightly above the bulged portions 23 and 24 of the top. The edges of the knobs 44 and 45 are preferably ribbed or knurled so as to permit rotation of the knobs from the exterior of the cabinet. One of the knobs is connected to the tuning condensers to tune the radio receiving unit while the other knob serves as the volume control adjustment and also serves as the radio on and off switch.

From the foregoing description it will be obvious that once the chassis is inserted into its cabinet no additional connections need be made between the chassis and the cabinet. There are no shafts protruding from apertures in the casing and upon which operating knobs must be inserted. There are no switches on the cabinet which must be electrically connected to the chassis. Furthermore the speaker and aerial are merely mounted upon the chassis mounting panel 32 and are not individually connected to the cabinet itself.

The front wall of the cabinet is provided with an aperture 45 forwardly of the speaker 33. A grill 46 is supported by the front wall 22 of the radio receiving unit to improve the appearance of the cabinet and also to permit sound to leave the cabinet and at the same time conceal the speaker from view. This grill is best illustrated in Figures 5 and 8 of the drawings and is preferably formed of molded plastic with a series of projected posts 47 extending rearwardly therefrom. These posts 47 extend through apertures 49 in the front wall 22 of the cabinet B, thus holding the grill in proper position upon the front wall. Spring washers 50, illustrated in Figures 7 and 8 of the drawings, are forced over these posts 47 to hold the grill assembled on the front of the radio receiving unit. These spring washers are split to provide tension against the posts in such a way that the material of the washer tends to dig into the plastic as an attempt is made to remove the washers from the posts.

Figures 9, 10:
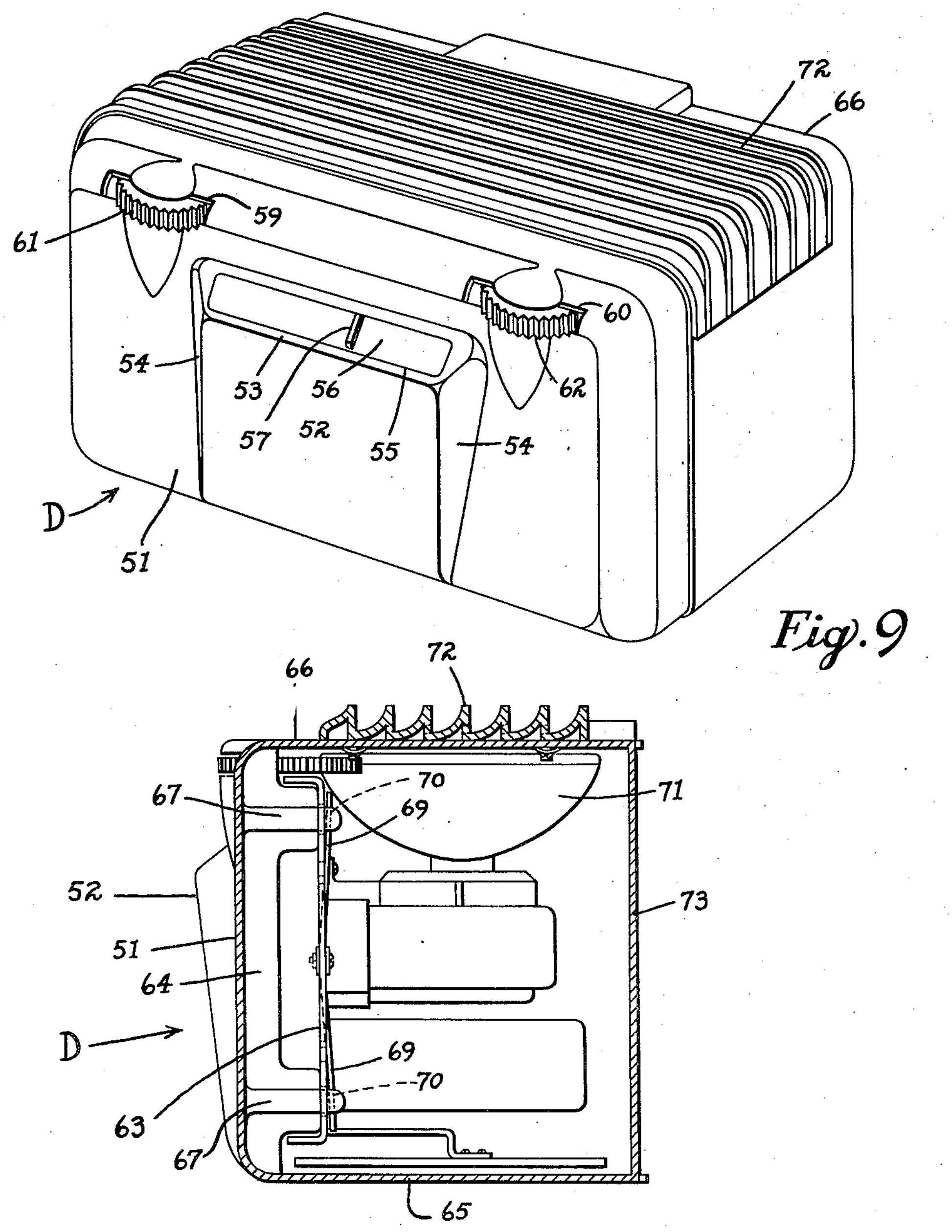
Figure 9 is a perspective view of a modified form of cabinet showing the operating knobs on the front of the cabinet.
Figure 10 is a sectional view through the cabinet of Figure 9.

In Figures 9 and 10 of the drawings I disclose a radio receiving unit D which is substantially identical to the radio receiving unit A, with the exception of the fact that the chassis is mounted upon horizontally extending posts rather than vertically extending posts. In the form illustrated the front panel 51 of the radio is provided with a forwardly and upwardly inclined panel 52 merging into a rearwardly and upwardly inclined integral panel 53. Substantially triangular side panels 54 connect the sides of these panels to the front panel 51. An aperture 55 is provided in the panel 53 which contains a transparent scale 56. An indicating pointer 57 operated in unison with the tuning condensers moves longitudinally of the scale 56 in the usual manner to indicate the setting of the tuning condensers.

Slots 59 and 60 are provided in the panel 51 through which the radio operating knobs 61 and 62 extend. The knobs 61 and 62 are mounted upon the chassis 63. Reinforcing ribs 64 extend vertically from the bottom cabinet panel 65 to the top cabinet panel 66. Posts 67 project rearwardly from the front panel 51, the axes of these posts extending generally horizontally. The chassis 63 is equipped with apertures through which the posts 67 extend and wire springs 69, identical to the springs 40, engage in notches 70 in the posts 67.

The chassis illustrated in Figure 10 is identical to the chassis C previously described. The speaker 71 in the radio receiving unit D directs sound through the grill 72 mounted on the top panel 66. The grill is identical to the grill 46 previously described. A rear wall panel 73 may be provided to close the rear side of the radio if it is so desired.

Obviously when the chassis is inserted into the cabinet, the knobs 61 and 62 extend through the slots 59 and 60 and the chassis is supported by the posts 67, the wire springs 69 holding the chassis so supported. In a similar manner the chassis could be rearranged so as to direct the speaker 71 rearwardly or through a grill on the front of the cabinet if so desired.

In accordance with the patent statutes, I have described the principles of construction and operation of my radio chassis mounting construction, and while I have endeavored to set forth the best embodiments thereof, I desire to have it understood that obvious changes may be made within the scope of the following claims without departing from the spirit of my invention.

I claim:

1. A radio chassis support for use in conjunction with a self-contained radio chassis having a radio receiving unit supported thereupon and including control knobs supported on axes arranged in parallel planes and projecting beyond the periphery of the chassis, a cabinet having an open side and a closed side opposite to said open side, a series of substantially parallel posts on said closed side projecting toward said open side, apertures in said chassis designed to accommodate said posts as said chassis is inserted into said cabinet and moved toward said closed side, means on said closed side engageable with said chassis to limit movement of said chassis toward said closed side, resilient means on said chassis, notches in said posts for accommodating said resilient means to lock said chassis from movement longitudinally of said posts in a direction away from said closed side, and slots in said closed side of said cabinet through which portions of said control knobs extend when said chassis is engaged on said posts, said control means being operable from exteriorly of said cabinet through said slots.

2. A radio chassis support including a hollow cabinet having closed side walls, a closed top and an open bottom, a series of generally parallel posts projecting downwardly from said top within said cabinet, a chassis mounting panel having a radio receiving unit supported thereupon, portions of said receiving set being supported by said panel to extend toward the bottom of the cabinet, being supported in inverted position, a pair of control knobs supported by said mounting panel and projecting upwardly above the level of the same, a pair of slots in the top of said cabinet through which said control knobs may project, resilient means on said mounting panel, and slots in said posts into which said resilient members are engageable, said resilient members holding said mounting panel engaged upon said posts and suspended from the top of the cabinet, said control knobs projecting through the top of the cabinet when said mounting panel is thus suspended.

3. The structure described in claim 2 and including a station indicating mechanism projecting above said mounting panel, and a slot in the top of said cabinet through which said indicating mechanism is visible when said mounting panel is supported upon said posts.

4. A radio chassis support for supporting a chassis within a hollow cabinet, the cabinet having a closed side and an open side opposite said closed side, said closed side having a series of parallel posts mounted thereupon, a radio chassis of dimensions to fit freely within said cabinet for movement toward and away from said closed side, said chassis having apertures therethrough for accommodation of said posts, said posts and apertures being proportioned so that the apertures substantially align with said posts when said chassis fits into said cabinet, said chassis being proportioned relative to said cabinet to prevent substantial misalignment of said posts with said apertures, and resilient means on said chassis engageable with the portion of said posts projecting through said apertures to hold said chassis engaged thereupon.

5. The structure described in claim 4 and in which the portions of the posts projecting through the apertures have slots therein into which said resilient means engage.

6. The structure described in claim 4 and including means on said chassis for limiting movement of said chassis toward said closed side.

7. The structure described in claim 4 and in which the portions of the posts projecting through said apertures are slotted to accommodate said resilient means, and said resilient means bridges said apertures when engaged in the slots to prevent withdrawal of said posts through said apertures.

8. The structure described in claim 4 and in which the resilient means are supported on said chassis at a substantial distance from said posts and include a free end capable of springing away from said chassis upon insertion of the posts through the apertures and normally bridging the apertures.

9. A radio chassis support including a hollow cabinet having tubularly arranged side walls having a closed end and an open end, a pair of generally parallel partition walls extending across said cabinet adjacent said closed end, a pair of posts integral with each partition wall and projecting beyond the partition walls toward said open end, a chassis having apertures therethrough designed to accommodate said posts, said chassis being slidably supported by said posts and engageable against said partition walls, resilient means secured to the surface of said chassis nearest said open end, said resilient means being anchored to said chassis at points remote from said apertures and having ends arranged to normally bridge said apertures, the portion of said posts projecting through said apertures having slots therein into which said resilient means may engage, said resilient means bridging said apertures when engaged in said slots.

BARTON T. SETCHELL.

REFERENCES CITED

The following references are of record in the file of this patent:

UNITED STATES PATENTS

| Number | Name | Date |
|---|---|---|
| 418,031 | Clevis | Dec. 24, 1889 |
| 1,665,891 | Mystrom | Apr. 19, 1928 |
| 1,724,371 | Roth | Aug. 13, 1929 |
| 1,838,515 | Hooley | Dec. 29, 1931 |
| 2,057,116 | Rubens | Oct. 13, 1936 |
| 2,108,846 | Brown | Feb. 22, 1938 |
| 2,174,107 | Kenney | Sept. 26, 1939 |
| 2,307,807 | Scriven et al. | Jan. 12, 1943 |
| 2,382,428 | Leuvelink | Aug. 14, 1945 |

FOREIGN PATENTS

| Number | Country | Date |
|---|---|---|
| 793,537 | France | June 21, 1936 |